(12) United States Patent
Shimoyama et al.

(10) Patent No.: US 6,224,507 B1
(45) Date of Patent: *May 1, 2001

(54) HYDRAULIC CONTROL SYSTEMS FOR AUTOMATIC TRANSMISSIONS

(75) Inventors: Akihiro Shimoyama; Masahiro Takiguchi; Mitsugi Tazawa, all of Shizuoka (JP)

(73) Assignee: Jatco Corporation, Fuji (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,930

(22) Filed: Jul. 14, 1998

(30) Foreign Application Priority Data

Jul. 14, 1997 (JP) .................................................... 9-188151
Jul. 16, 1997 (JP) .................................................... 9-191385

(51) Int. Cl.⁷ .................................................... F16H 31/00
(52) U.S. Cl. ............................................................ 475/129
(58) Field of Search ................................... 475/129, 128, 475/127, 116

(56) References Cited

U.S. PATENT DOCUMENTS

| 4,428,258 | * | 1/1984 | Kubo et al. ............................ 74/867 |
| 5,431,608 | * | 7/1995 | Hirose ............................ 475/129 X |
| 5,478,288 | * | 12/1995 | Sakakibara et al. .................. 475/129 |
| 5,538,480 | * | 7/1996 | Torimoto ............................ 475/129 |
| 5,588,927 | * | 12/1996 | Tsukamoto et al. ................. 475/128 |
| 5,616,094 | * | 4/1997 | Tsukamoto et al. ................. 475/128 |
| 5,695,423 | * | 12/1997 | Hirose ................................. 475/129 |
| 5,800,309 | * | 9/1998 | Takiguchi et al. ................... 477/144 |
| 5,810,692 | * | 9/1998 | Takiguchi et al. ................... 477/144 |
| 5,857,935 | * | 1/1999 | Takiguchi ......................... 475/129 X |
| 5,899,831 | * | 5/1999 | Takiguchi ......................... 475/129 X |
| 5,913,748 | * | 6/1999 | Takiguchi ............................. 477/148 |

FOREIGN PATENT DOCUMENTS 4-81065    12/1992  (JP) .
5-248526    9/1993  (JP) .

* cited by examiner

Primary Examiner—Charles A. Marmor
Assistant Examiner—Ha Ho
(74) Attorney, Agent, or Firm—Foley & Lardner

(57) ABSTRACT

A hydraulic control system for an automatic transmission includes first and second passages connected to first and second engaging elements, first and second accumulators arranged with the first and second passages, and a timing valve connected to a back-pressure chamber of the first accumulator and for determining a timing for draining a first pressure within the back-pressure chamber of the first accumulator in accordance with a second pressure within a back-pressure chamber of the second accumulator.

14 Claims, 9 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ◉ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| GEAR POSITIONS \ SOLENOIDS | SHIFT SOLENOID (A) | SHIFT SOLENOID (B) |
|---|---|---|
| 1st | ○ | ○ |
| 2nd | × | ○ |
| 3rd | × | × |
| 4th | ○ | × |

○ ····· ON (DRAIN CKT CLOSED)
× ····· OFF (DRAIN CKT OPEN)

|  | REV/C | HIGH/C | 2-4/B | LOW/C | L&R/B | LOW O.W.C |
|---|---|---|---|---|---|---|
| 1st |  |  |  | ○ | ◌ | ◍ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| GEAR POSITIONS \ SOLENOIDS | SHIFT SOLENOID (A) | SHIFT SOLENOID (B) |
|---|---|---|
| 1st | ○ | ○ |
| 2nd | × | ○ |
| 3rd | × | × |
| 4th | ○ | × |

{ ○ ····· ON (DRAIN CKT CLOSED)
{ × ····· OFF (DRAIN CKT OPEN)

HYDRAULIC CONTROL SYSTEMS FOR AUTOMATIC TRANSMISSIONS

BACKGROUND OF THE INVENTION

The present invention relates to hydraulic control systems for automatic transmissions.

One of the conventionally proposed hydraulic control systems for automatic transmissions is known in JP-A 5-248526. This reference describes a low-clutch sequence valve for draining an accumulator back pressure of a low clutch on the release side in taking account of a rise of a working pressure of a band brake on the engagement side and the accumulator back pressure of the low clutch on the release side.

With the known hydraulic control system, however, a drain timing is determined based on the accumulator back pressure of the low clutch on the release side, so that if the accumulator back pressure is varied, its drain timing is shifted. Specifically, the accumulator back pressure on the release side and the working pressure on the engagement side produced from a line pressure or a source pressure are varied together, so that if the accumulator back pressure is reduced due to dispersion or deterioration of a device, a working pressure which serves to drain the accumulator back pressure is also reduced, resulting in lowered switching pressure in a characteristic of the working pressure on the engagement side. This decreases the torque capacity on the release side though a sufficient torque capacity on the engagement side is not secured yet, causing engine racing.

It is, therefore, an object of the present invention to provide hydraulic control systems for automatic transmissions which always ensure achievement of an optimum timing for draining the accumulator back pressure on the release side upon shifting regardless of variations in hydraulic pressure due to dispersion or deterioration of a device on the release side.

SUMMARY OF THE INVENTION

One aspect of the present invention lies in providing a hydraulic control system for an automatic transmission which achieves shifting by releasing a first engaging element as engaged and engaging a second engaging element as released, the system comprising:

a first passage connected to the first engaging element;

a second passage connected to the second engaging element;

a first accumulator arranged with said first passage, said first accumulator including a back-pressure chamber having a first pressure;

a second accumulator arranged with said second passage, said second accumulator including a back-pressure chamber having a second pressure; and a timing valve connected to said back-pressure chamber of said first accumulator, said timing valve determining a timing for draining said first pressure of said first accumulator in accordance with said second pressure of said second accumulator.

Another aspect of the present invention lies in providing a hydraulic control system for an automatic transmission which achieves shifting by releasing a first engaging element as engaged and engaging a second engaging element as released, the system comprising:

a first passage connected to the first engaging element;

a second passage connected to the second engaging element;

a first accumulator arranged with said first passage, said first accumulator including a back-pressure chamber having a first pressure;

a second accumulator arranged with said second passage, said second accumulator including a back-pressure chamber having a second pressure;

a timing valve connected to said back-pressure chamber of said first accumulator, said timing valve determining a timing for draining said first pressure of said first accumulator in accordance with said second pressure of said second accumulator;

a first device connected to said back-pressure chamber of said first accumulator, said first device controlling said first pressure of said first accumulator; and a second device connected to said back-pressure chamber of said second accumulator, said second device controlling said second pressure of said second accumulator.

Still another aspect of the present invention lies in providing a hydraulic control system for an automatic transmission which achieves shifting by engaging and releasing first, second, and third engaging elements, the system comprising:

a first passage connected to the first engaging element;

a second passage connected to the second engaging element;

a third passage connected to the third engaging element;

a first accumulator arranged with said first passage, said first accumulator including a back-pressure chamber having a first pressure;

a second accumulator arranged with said second passage, said second accumulator including a back-pressure chamber having a second pressure;

a third accummulator arranged with said third passage, said third accumulator including a back-pressure chamber having a third pressure;

a first device connected to said back-pressure chamber of said first accumulator, said first device controlling said first pressure of said first accumulator; and a second device connected to said back-pressure chamber of said second accumulator, said second device controlling said second pressure of said second accumulator.

A further aspect of the present invention lies in providing a hydraulic control system for an automatic transmission which achieves four speeds by first, second and third engaging elements operated hydraulically and a one-way clutch operated mechanically upon 2-1 shift, said first engaging element being engaged in the first, second and third gears, said second engaging element being engaged in the second and fourth gears, said third engaging element being engaged in the third and fourth gears, the system comprising:

a first passage connected to the first engaging element;

a second passage connected to the second engaging element;

a third passage connected to the third engaging element;

a first accumulator arranged with said first passage, said first accumulator including a back-pressure chamber having a first pressure;

a second accumulator arranged with said second passage, said second accumulator including a back-pressure chamber having a second pressure;

a third accummulator arranged with said third passage, said third accumulator including a back-pressure chamber having a third pressure;

a first device connected to said back-pressure chambers of said first and third accumulators, said first device controlling said first and third pressures of said first and third accumulators; and a second device connected to said back-pressure chamber of said second accumulator, said second device controlling said second pressure of said second accumulator.

DETAILED DESCRIPTION OF THE INVENTION

Figures 1, 2:
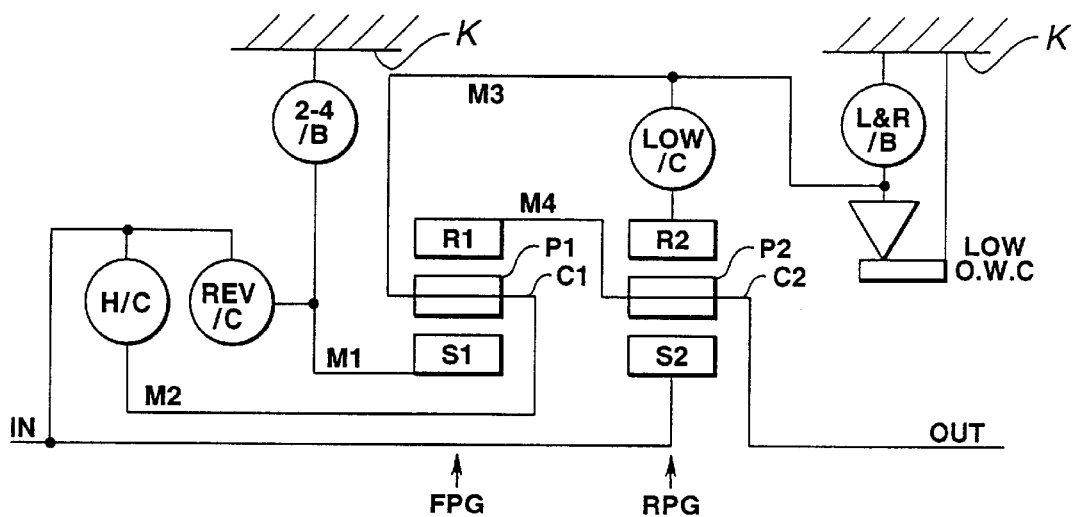
FIG. 1 is a block diagram showing a power train of an automatic transmission to which the present invention is applied.
FIG. 2 is a table showing an engagement logic of the automatic transmission.

Referring to the drawings wherein like reference numerals designate like parts throughout the views, a hydraulic control system for automatic transmissions embodying the present invention will be described.

FIGS. 1–6 show a first embodiment of the present invention. Referring to FIG. 1, a power train of an automatic transmission comprises an input shaft IN, an output shaft OUT, a front planetary gear FPG, and a rear planetary gear RPG. The front planetary gear FPG includes a first sun gear S1, a first ring gear R1, a first pinion P1, and a first pinion carrier C1, whereas the rear planetary gear RPG includes a second sun gear S2, a second ring gear R2, a second pinion P2, and a second pinion carrier C2.

Engaging elements arranged in the above gear train for obtaining four forward speeds and one reverse speed include a reverse clutch REV/C (or R/C), a high clutch HIGH/C (or H/C), a 2-4 brake 2-4/B, a low clutch LOW/C (or L/C), a low & reverse brake L&R/B, and a low one-way clutch LOW O.W.C.

The sun gear S1 is connected to the input shaft IN through a first rotary member Ml and the reverse clutch R/C, and to a casing K through the first rotary member M1 and the 2-4 brake 2-4/B.

The first carrier C1 is connected to the input shaft IN through a second rotary member M2 and the high clutch H/C, and to the casing K through a third rotary member M3 and the low & reverse brake L&R/B. Moreover, the first carrier C1 is connected to the second ring gear R2 through the third rotary member M3 and the low clutch L/C. The low one-way clutch LOW O.W.C is arranged parallel to the low & reverse brake L&R/B.

The first ring gear R1 is directly connected to the second carrier C2 through a fourth rotary member M4, and the output shaft OUT is also directly connected thereto.

The second sun gear S2 is directly connected to the input shaft IN.

The feature of the power train lies in its reduced size and weight by decreasing the number of engaging elements by removing a one-way clutch adopted for obtaining an engaging timing with no shift shock upon 3-4 upshift, and a hydraulically engaged clutch required for securing engine brake due to adoption of the one-way clutch.

Referring to FIG. 2, the first gear is obtained by hydraulic engagement of the low clutch L/C, and hydraulic engagement of the low & reverse brake L&R/B (during engine brake selected) or mechanical engagement of the low one-way clutch LOW O.W.C (during acceleration). That is, the second sun gear S2 serves to input power, the second ring gear R2 is stationary, and the second carrier C2 serves to output power.

The second gear is obtained by hydraulic engagement of the low clutch L/C and the 2-4 brake 2-4/B. That is, the second sun gear S2 serves to input power, the first sun gear S1 is stationary, and the second carrier C2 serves to output power.

The third gear is obtained by hydraulic engagement of the high clutch H/C and the lower clutch L/C. That is, both of the second ring gear R2 and the second sun gear S2 serve to input power, and the second carrier C2 serves to output power (gear ratio=1).

The fourth gear is obtained by hydraulic engagement of the high clutch H/C and the 2-4 brake 2-4/B. That is, the first carrier C1 and the second sun gear S2 serve to input power, the first sun gear Si is stationary, and the second carrier C2 serves to output power. The fourth gear corresponds to the overdrive (OD) gear.

The reverse gear is obtained by hydraulic engagement of the reverse clutch R/C and the low & reverse brake L&R/B. That is, the first and second sun gears S1, S2 serve to input power, the first carrier C1 is stationary, and the second carrier C2 serves to output power.

The 2-4 brake 2-4/B includes a multidisc brake having the same structure as that of a multidisc clutch.

Figure 3:
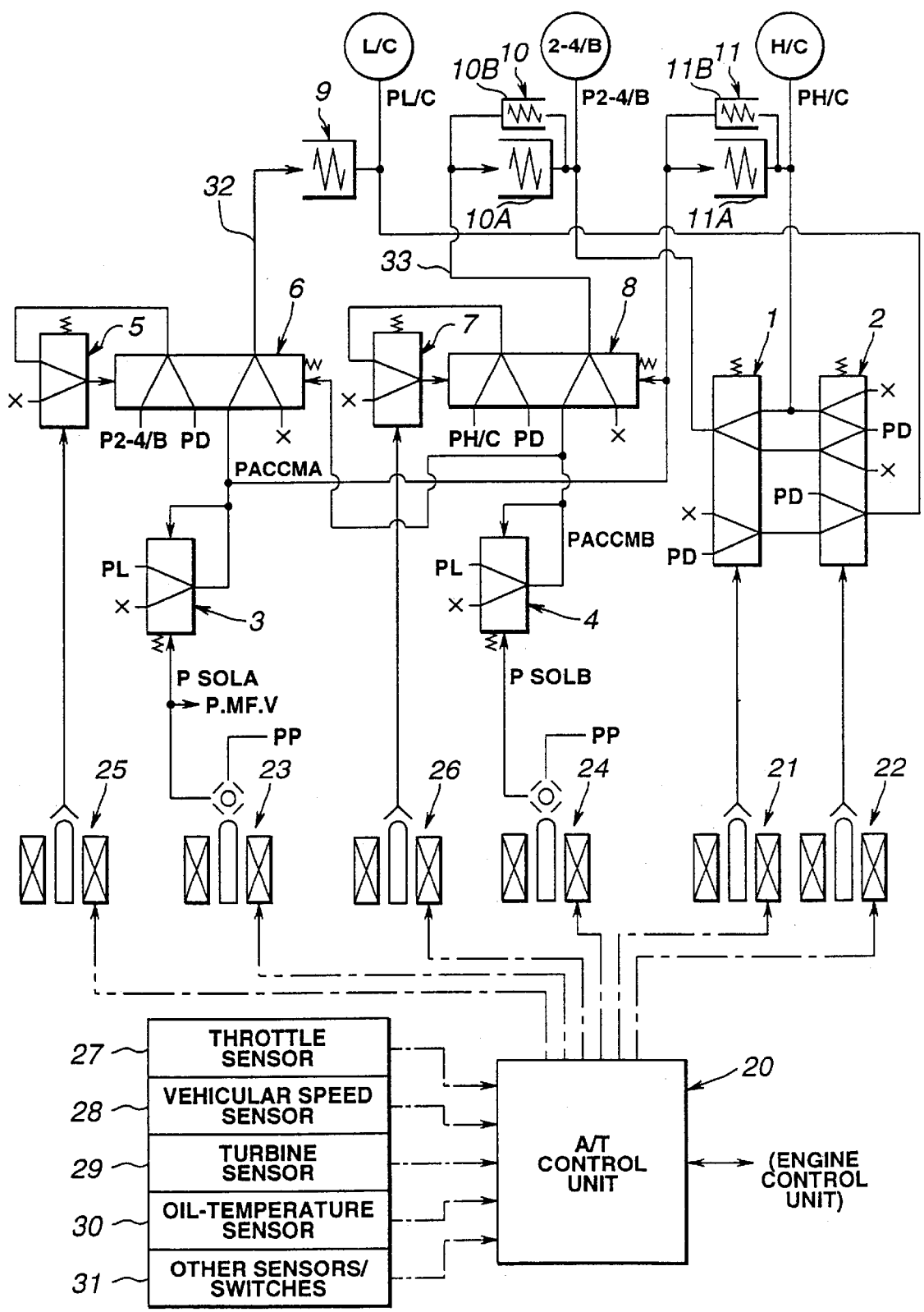
FIG. 3 is a view similar to FIG. 1, showing a first embodiment of a control system including a control-valve part and an electronic control part.

Referring to FIG. 3, a control system includes a control-valve part and an electronic control part. The engaging elements include the low clutch L/C, the 2-4 brake 2-4/B, and the high clutch H/C.

The control-valve part comprises a shift valve (A) 1, a shift valve (B) 2, an accumulator control valve (A) 3, an accumulator control valve (B) 4, a low-clutch timing valve 5, a low-clutch sequence valve 6, a 2-4 brake timing valve 7, a 2-4 brake sequence valve 8, a low-clutch accumulator 9, a 2-4 brake accumulator unit 10, and a high-clutch accumulator unit 11.

The shift valves (A) 1, (B) 2 switch a hydraulic passage in each of the first to fourth gears in accordance with operation of shift solenoids (A) 21, (B) 22.

The accumulator control valve (A) 3 reduces a line pressure PL in accordance with the magnitude of a solenoid pressure PSOLA produced by a line-pressure duty solenoid 23 to regulate an accumulator control pressure (A) PACCMA. The solenoid pressure PSOLA is also led to a pressure modifier valve for regulating a modifier pressure which serves as a signal pressure for the line pressure PL produced by a pressure regulator valve, not shown.

The accumulator control valve (B) 4 reduces the line pressure PL in accordance with the magnitude of a solenoid pressure PSOLB produced by a 2-4 brake duty solenoid 24 to regulate an accumulator control pressure (B) PACCMB.

The low-clutch timing valve 5 includes a selector valve which puts a signal-pressure passage on the drain side when a low-clutch timing solenoid 25 is turned off, and on the communication side when it is turned on by a hydraulic pressure produced.

The low-clutch sequence valve 6 controls a back pressure within the low-clutch accumulator 9 upon upshift to the fourth gear or downshift therefrom.

The 2-4 brake timing valve 7 includes a selector valve which puts the signal-pressure passage on the drain side when a 2-4 brake timing solenoid 26 is turned off, and on the communication side when it is turned on by a hydraulic pressure produced.

The 2-4 brake sequence valve 8 controls a back pressure within the 2-4 brake accumulator unit 10 upon upshift to the third gear or downshift therefrom.

The low-clutch accumulator 9 receives in its back-pressure chamber the accumulator control pressure (A) PACCMA through the low-clutch sequence valve 6 and a low-clutch accumulator back-pressure circuit 32 to ensure smooth engagement and release of the low-clutch L/C.

The 2-4 brake accumulator unit 10 receives in its back-pressure chamber the accumulator control pressure (B) PACCMB through the 2-4 brake sequence valve 8 and a 2-4 brake accumulator back-pressure circuit 33 to ensure smooth engagement and release of the 2-4 brake 2-4/B. The 2-4 brake accumulator unit 10 comprises two accumulators 10A, 10B including in a cylinder a piston and a spring having a biasing direction opposite to the back pressure, respectively, to provide an accumulator characteristic having two different shelf pressures. It is noted that the shelf pressure means a hydraulic pressure having a value between values upon drainage and final engagement, obtained, e.g. upon semiengagement of the clutch, and having a rise rather flatly restrained like a shelf during a predetermined period of time.

The high-clutch accumulator unit 11 receives in its back-pressure chamber the accumulator control pressure (A) PACCMA directly to ensure smooth engagement and release of the high clutch H/C. The high-clutch accumulator unit 11 comprises two accumulators 11A, 11B including in a cylinder a piston and a spring having a biasing direction opposite to the back pressure, respectively, to provide an accumulator characteristic having two different shelf pressures.

The electronic control part comprises actuators for controlling a hydraulic pressure in accordance with a drive command out of an automatic-transmission (A/T) control unit 20, such as the shift solenoid (A) 21, the shift solenoid (B) 22, the line-pressure duty solenoid 23, the 2-4 brake duty solenoid 24, the low-clutch timing solenoid 25, and the 2-4 brake timing solenoid 26.

Connected to the A/T control unit 20 are information sources such as a throttle sensor 27 for sensing a throttle-valve opening degree, a vehicle-speed sensor 28 for sensing a vehicle speed, a turbine sensor 29 for sensing a turbine rotation, an oil-temperature sensor 30 for sensing an oil temperature, and other sensors/switches 31.

Figures 4, 5:
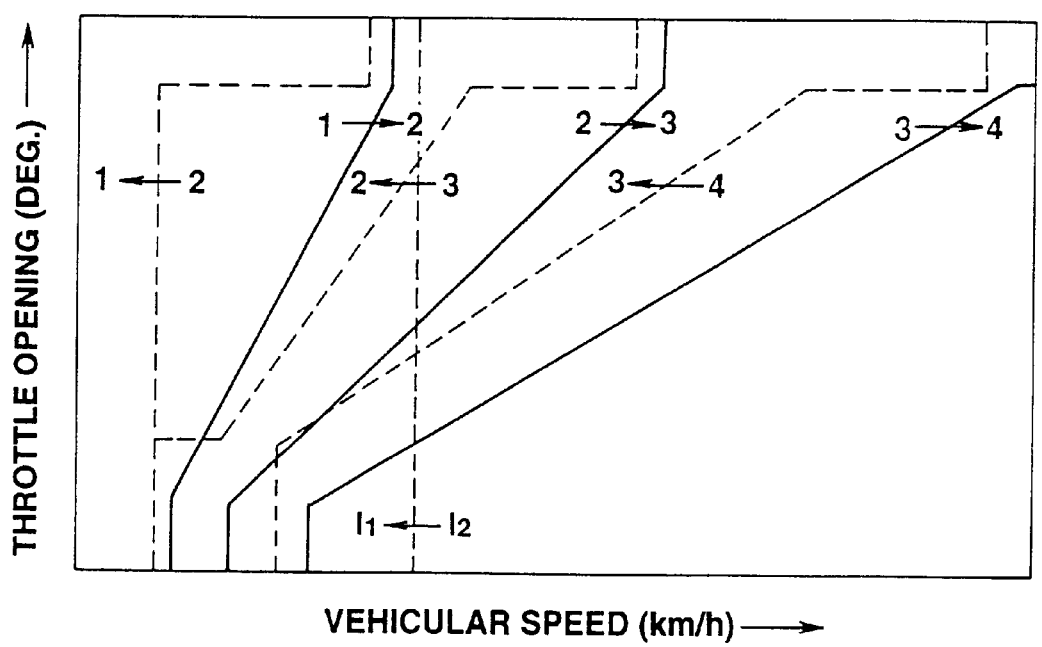
FIG. 4 is a view similar to FIG. 2, showing operation of shift solenoids.
FIG. 5 is a chart showing a shift-point characteristic model.

Shift control for obtaining automatic shifting between first to fourth gears in the drive (D) range is carried out as follows. In accordance with a shift-point characteristic model chart as shown in FIG. 5 and the throttle-valve opening degree and vehicle speed sensed and when crossing a shift line of upshift or downshift, a shift command is given to determine a next gear. In order to obtain the gear determined, the A/T control unit 20 provides an on or off command to the shift solenoids (A) 21, (B) 22 in accordance with a shift-solenoid operation table as shown in FIG. 4.

It is noted that upon 2-3 upshift, the 2-4 brake 2-4/B corresponds to a first engaging element, the high clutch H/C corresponds to a second engaging element, the 2-4 brake accumulator unit 10 corresponds to a first accumulator, the high-clutch accumulator unit 11 corresponds to a second accumulator, and the 2-4 brake sequence valve 8 corresponds to a timing valve.

Upon 3-4 upshift, the low clutch L/C corresponds to a first engaging element, the 2-4 brake 2-4/B corresponds to a second engaging element, the low-clutch accumulator unit 9 corresponds to a first accumulator, the 2-4 brake accumulator unit 10 corresponds to a second accumulator, and the low-clutch sequence valve 6 corresponds to a timing valve.

Next, the operation of the first embodiment will be described.

A description will be made with regard to drain timing control of the low-clutch accumulator back pressure carried out by the low-clutch sequence valve 6 upon 3-4 upshift where the 2-4 brake 2-4/B is engaged, and the low clutch L/C is released.

Since an on command is maintained to the low-clutch timing solenoid 25, the low-clutch timing valve 5 remains switched on the side of supplying a 2-4 brake pressure P2-4/B to the low-clutch sequence valve 6. Thus, with the low-clutch sequence valve 6, a valve-operation signal pressure which is effective in the direction to receive the low-clutch accumulator back pressure corresponds to an accumulator back pressure on the engagement side or the accumulator control pressure (B) PACCMB with a spring road provided, and a valve-operation signal pressure which is effective in the direction to drain the low-clutch accumulator back pressure corresponds to the 2-4 brake pressure P2-4/B as an engagement pressure. That is, a timing for draining the accumulator back pressure of the low clutch L/C on the release side is determined in accordance with the accumulator control pressure (B) PACCMB as an accumulator back pressure on the engagement side.

During the third gear, the 2-4 brake pressure P2-4/B is not produced, and the accumulator control pressure (B) PACCMB as an accumulator back pressure on the engagement side is effective leftward as viewed in FIG. 3, so that the low-clutch accumulator 9 receives a back pressure or the accumulator control pressure (A) PACCMA.

If upshift determination is made from the third gear to the fourth gear, a command to the shift solenoid (A) 21 is switched from off to on, and a hydraulic passage to the low clutch L/C is switched from the D-range pressure supply side to the drain side, whereas a hydraulic passage to the 2-4 brake 2-4/B is switched from the drain side to the D-range pressure supply side.

Figure 6:
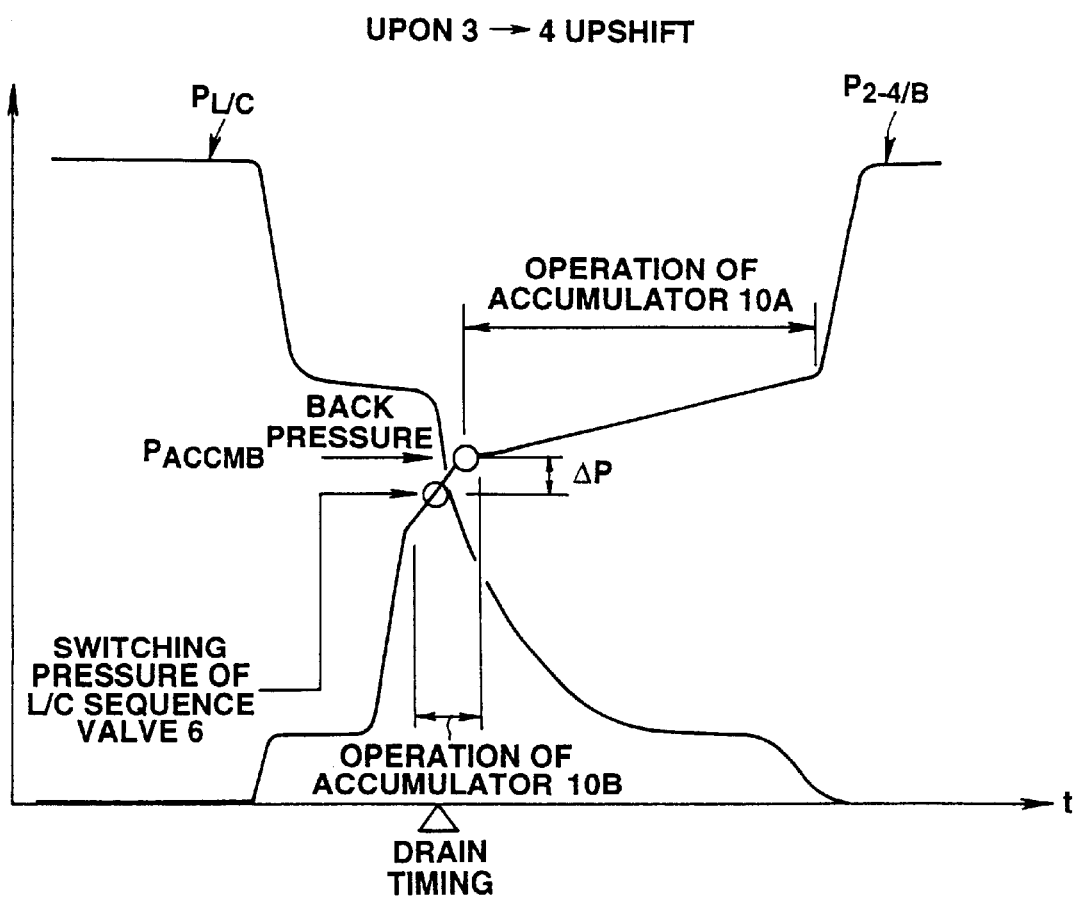
FIG. 6 is a view similar to FIG. 5, showing a hydraulic-pressure characteristic upon 3-4 upshift.

Thus, with the 2-4 brake pressure P2-4/B, referring to FIG. 6, the pressure is increased after termination of a stroke of a clutch piston, in accordance with which a first shelf pressure is obtained by a stroke of a piston of the accumulator 10B, then, a second shelf pressure is obtained by a stroke of a piston of the accumulator 10A. As soon as the stroke of the accumulator 10A is terminated, the pressure is sharply increased to a line-pressure level to obtain engagement of the 2-4 brake 2-4/B.

On the other hand, with a low-clutch pressure PL/C, referring to FIG. 6, the pressure is sharply decreased from a line-pressure level to an accumulator back-pressure level. As soon as the 2-4 brake pressure P2-4/B as a working pressure on the engagement side is equal to a switching pressure of the low-clutch sequence valve 6, the low-clutch accumulator back pressure is drained, so that the low-clutch pressure PL/C is decreased with great incline to a releasing-pressure level to obtain release of the low clutch L/C.

Specifically, as soon as a differential pressure ΔP between the accumulator control pressure (B) PACCMB as an accumulator back pressure on the engagement side and the 2-4 brake pressure P2-4/B as a working pressure on the engagement side is equal to a predetermined value given in accordance with a spring load and a spool pressure receiving area, a spool of the low-clutch sequence valve 6 is switched on the side of draining the low-clutch accumulator back pressure.

In such a way, the accumulator back pressure of the low clutch L/C on the release side is drained in accordance with the accumulator control pressure (B) PACCMB as an accumulator back pressure on the engagement side, so that an optimum timing for draining the low-clutch accumulator back pressure on the release side upon 3-4 upshift can always be obtained regardless of variations in hydraulic pressure due to dispersion or deterioration of a device on the release side.

Moreover, a shift time can be determined in accordance with a working pressure within the accumulator 10A without being influenced by a hydraulic pressure on the release side, so that continuous adaptation of the accumulator back pressure on the engagement side to an appropriate value by self-learning control, etc. allows the shift time controlled to ensure an excellent shift quality.

Moreover, the switching pressure of the low-clutch sequence valve 6 corresponds to a hydraulic pressure when the differential pressure ΔP between the accumulator control pressure (B) PACCMB as an accumulator back pressure on the engagement side and the 2-4 brake pressure P2-4/B as a working pressure on the engagement side is equal to a predetermined value, and it can be set, by adjustment of the accumulator back pressure on the engagement side, to a value at which the torque capacity on the engagement side is secured sufficiently. Thus, at a timing for draining the accumulator back pressure on the release side, i.e. decreasing the torque capacity on the release side, the torque capacity on the engagement side is secured sufficiently, producing no engine racing.

Likewise, upon 2-3 upshift where the high clutch H/C is engaged, and the 2-4 brake 2-4/B is released, drain timing control of the 2-4 brake accumulator back pressure is carried out by the 2-4 brake sequence valve 8.

Next, the effects of the first embodiment will be described.

First, the low-clutch sequence valve 6 is arranged to determine a timing for draining the accumulator back pressure of the low clutch L/C on the release side in accordance with the accumulator control pressure (B) PACCMB as an accumulator back pressure on the engagement side, so that an optimum timing for draining the low-clutch accumulator back pressure on the release side upon 3-4 upshift can always be obtained regardless of variations in hydraulic pressure due to dispersion or deterioration of a device on the release side.

Second, the low-clutch sequence valve 6 is constructed such that the accumulator back pressure on the release side is drained as soon as the differential pressure ΔP between the accumulator control pressure (B) PACCMB as an accumulator back pressure on the engagement side and the 2-4 brake pressure P2-4/B as a working pressure on the engagement side is equal to a predetermined value, so that optimum setting of a level of the accumulator back pressure on the engagement side allows a reduction in torque capacity on the release side at a timing where the torque capacity on the engagement side is secured, preventing engine racing upon 3-4 upshift.

Third, the 2-4 brake accumulator unit 10 comprises two accumulators 10A, 10B including in a cylinder a piston and a spring having a biasing direction opposite to the back pressure, respectively, to provide an accumulator characteristic having two different shelf pressures, so that a 2-4 brake pressure characteristic having two shelf pressures upon shifting is obtained, securing excellent shift quality. Moreover, the switching pressure of the low-clutch sequence valve 6 set in a shelf-pressure portion with small incline ensures stable drain timing.

Figures 7, 8:
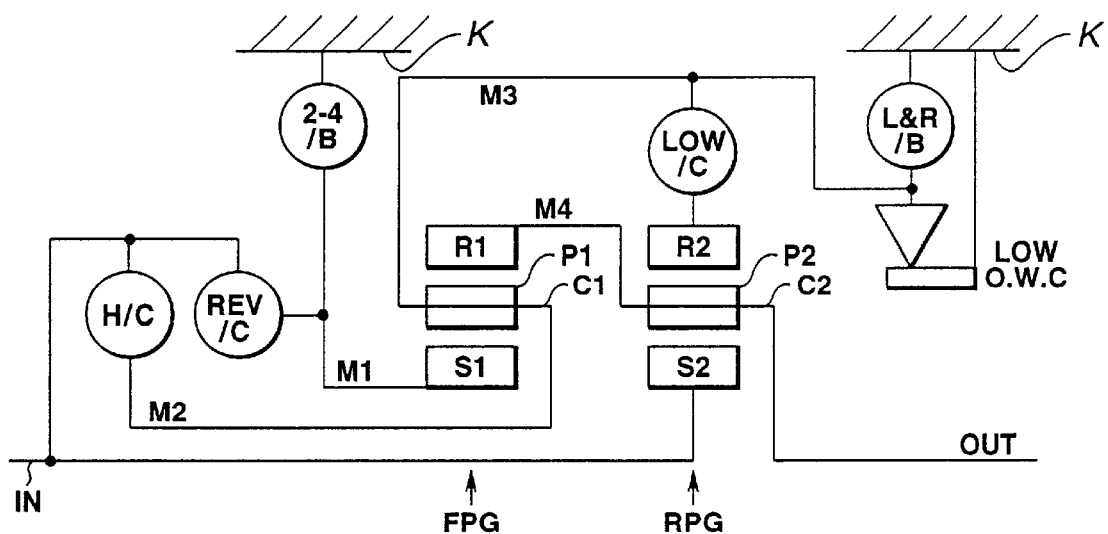
FIG. 7 is a view similar to FIG. 4, showing a power train of an automatic transmission to which the present invention is applied.
FIG. 8 is a view similar to FIG. 4, showing an engagement logic of the automatic transmission.

FIGS. 7–13 show a second embodiment of the present invention which is of substantially the same structure as that of the first embodiment. Referring to FIG. 7, a power train of an automatic transmission comprises an input shaft IN, an output shaft OUT, a front planetary gear FPG, and a rear planetary gear RPG. The front planetary gear FPG includes a first sun gear S1, a first ring gear R1, a first pinion P1, and a first pinion carrier C1, whereas the rear planetary gear RPG includes a second sun gear S2, a second ring gear R2, a second pinion P2, and a second pinion carrier C2.

Engaging elements arranged in the above gear train for obtaining four forward speeds and one reverse speed include a reverse clutch REV/C (or R/C), a high clutch HIGH/C (or H/C), a 2-4 brake 2-4/B, a low clutch LOW/C (or L/C), a low & reverse brake L&R/B, and a low one-way clutch LOW O.W.C.

The sun gear S1 is connected to the input shaft IN through a first rotary member M1 and the reverse clutch R/C, and to a casing K through the first rotary member M1 and the 2-4 brake 2-4/B.

The first carrier C1 is connected to the input shaft IN through a second rotary member M2 and the high clutch H/C, and to the casing K through a third rotary member M3 and the low & reverse brake L&R/B. Moreover, the first carrier C1 is connected to the second ring gear R2 through the third rotary member M3 and the low clutch L/C. The low one-way clutch LOW O.W.C is arranged parallel to the low & reverse brake L&R/B.

The first ring gear R1 is directly connected to the second carrier C2 through a fourth rotary member M4, and the output shaft OUT is also directly connected thereto.

The second sun gear S2 is directly connected to the input shaft IN.

The feature of the power train lies in its reduced size and weight by decreasing the number of engaging elements by removing a one-way clutch adopted for obtaining an engaging timing with no shift shock upon 3-4 upshift, and a hydraulically engaged clutch required for securing engine brake due to adoption of the one-way clutch.

Referring to FIG. 8, the first gear is obtained by hydraulic engagement of the low clutch L/C, and hydraulic engagement of the low & reverse brake L&R/B (during engine brake selected) or mechanical engagement of the low one-way clutch LOW O.W.C (during acceleration). That is, the second sun gear S2 serves to input power, the second ring gear R2 is stationary, and the second carrier C2 serves to output power.

The second gear is obtained by hydraulic engagement of the low clutch L/C and the 2-4 brake 2-4/B. That is, the second sun gear S2 serves to input power, the first sun gear S1 is stationary, and the second carrier C2 serves to output power.

The third gear is obtained by hydraulic engagement of the high clutch H/C and the lower clutch L/C. That is, both of the second ring gear R2 and the second sun gear S2 serve to input power, and the second carrier C2 serves to output power (gear ratio=1).

The fourth gear is obtained by hydraulic engagement of the high clutch H/C and the 2-4 brake 2-4/B. That is, the first carrier C1 and the second sun gear S2 serve to input power, the first sun gear Si is stationary, and the second carrier C2 serves to output power. The fourth gear corresponds to the overdrive (OD) gear.

The reverse gear is obtained by hydraulic engagement of the reverse clutch R/C and the low & reverse brake L&R/B. That is, the first and second sun gears S1, S2 serve to input power, the first carrier C1 is stationary, and the second carrier C2 serves to output power.

The 2-4 brake 2-4/B includes a multidisc brake having the same structure as that of a multidisc clutch.

Figure 9:
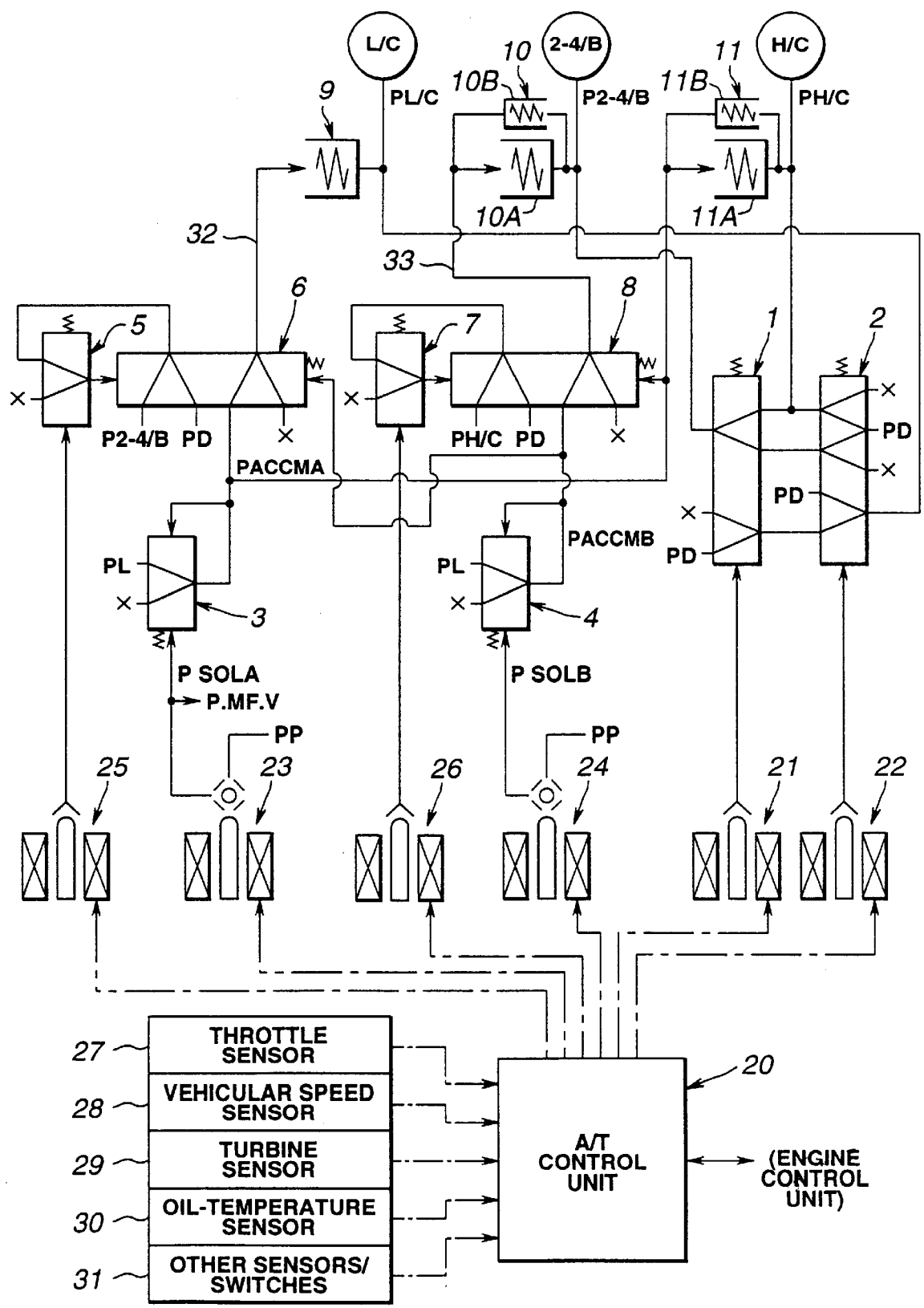
FIG. 9 is a view similar to FIG. 7, showing a second embodiment of a control system including a control-valve part and an electronic control part.

Referring to FIG. 9, a control system includes a control-valve part and an electronic control part. The engaging elements include the low clutch L/C, the 2-4 brake 2-4/B, and the high clutch H/C.

The control-valve part comprises a shift valve (A) 1, a shift valve (B) 2, an accumulator control valve (A) 3, an accumulator control valve (B) 4, a low-clutch timing valve 5, a low-clutch sequence valve 6, a 2-4 brake timing valve 7, a 2-4 brake sequence valve 8, a low-clutch accumulator 9, a 2-4 brake accumulator unit 10, and a high-clutch accumulator unit 11.

The shift valves (A) 1, (B) 2 switch a hydraulic passage in each of the first to fourth gears in accordance with operation of shift solenoids (A) 21, (B) 22.

The accumulator control valve (A) 3 reduces a line pressure PL in accordance with the magnitude of a solenoid pressure PSOLA produced by a line-pressure duty solenoid 23 to regulate an accumulator control pressure (A) PACCMA. The solenoid pressure PSOLA is also led to a pressure modifier valve for regulating a modifier pressure which serves as a signal pressure for the liner pressure PL produced by a pressure regulator valve, not shown.

The accumulator control valve (B) 4 reduces the line pressure PL in accordance with the magnitude of a solenoid pressure PSOLB produced by a 2-4 brake duty solenoid 24 to regulate an accumulator control pressure (B) PACCMB.

The low-clutch timing valve 5 includes a selector valve which puts a signal-pressure passage on the drain side when a low-clutch timing solenoid 25 is turned off, and on the communication side when it is turned on by a hydraulic pressure produced.

The low-clutch sequence valve 6 controls a back pressure within the low-clutch accumulator 9 upon upshift to the forth gear or downshift therefrom.

The 2-4 brake timing valve 7 includes a selector valve which puts the signal-pressure passage on the drain side when a 2-4 brake timing solenoid 26 is turned off, and on the communication side when it is turned on by a hydraulic pressure produced.

The 2-4 brake sequence valve 8 controls a back pressure within the 2-4 brake accumulator unit 10 upon upshift to the third gear or downshift therefrom.

The low-clutch accumulator 9 receives in its back-pressure chamber the accumulator control pressure (A) PACCMA through the low-clutch sequence valve 6 and a low-clutch accumulator back-pressure circuit 32 to ensure smooth engagement and release of the low-clutch L/C.

The 2-4 brake accumulator unit 10 receives in its back-pressure chamber the accumulator control pressure (B) PACCMB through the 2-4 brake sequence valve 8 and a 2-4 brake accumulator back-pressure circuit 33 to ensure smooth engagement and release of the 2-4 brake 2-4/B. The 2-4 brake accumulator unit 10 comprises two accumulators 10A, 10B including in a cylinder a piston and a spring having a biasing direction opposite to the back pressure, respectively, to provide an accumulator characteristic having two different shelf pressures.

The high-clutch accumulator unit 11 receives in its back-pressure chamber the accumulator control pressure (A) PACCMA directly to ensure smooth engagement and release of the high clutch H/C. The high-clutch accumulator unit 11 comprises two accumulators 11A, 11B including in a cylinder a piston and a spring having a biasing direction opposite to the back pressure, respectively, to provide an accumulator characteristic having two different shelf pressures.

The electronic control part comprises actuators for controlling a hydraulic pressure in accordance with a drive command out of an automatic-transmission (A/T) control unit 20, such as the shift solenoid (A) 21, the shift solenoid (B) 22, the line-pressure duty solenoid 23, the 2-4 brake duty solenoid 24, the low-clutch timing solenoid 25, and the 2-4 brake timing solenoid 26.

Connected to the A/T control unit 20 are information sources such as a throttle sensor 27 for sensing a throttle-valve opening degree, a vehicle-speed sensor 28 for sensing a vehicle speed, a turbine sensor 29 for sensing a turbine rotation, an oil-temperature sensor 30 for sensing an oil temperature, and other sensors/switches 31.

Figures 10, 11:
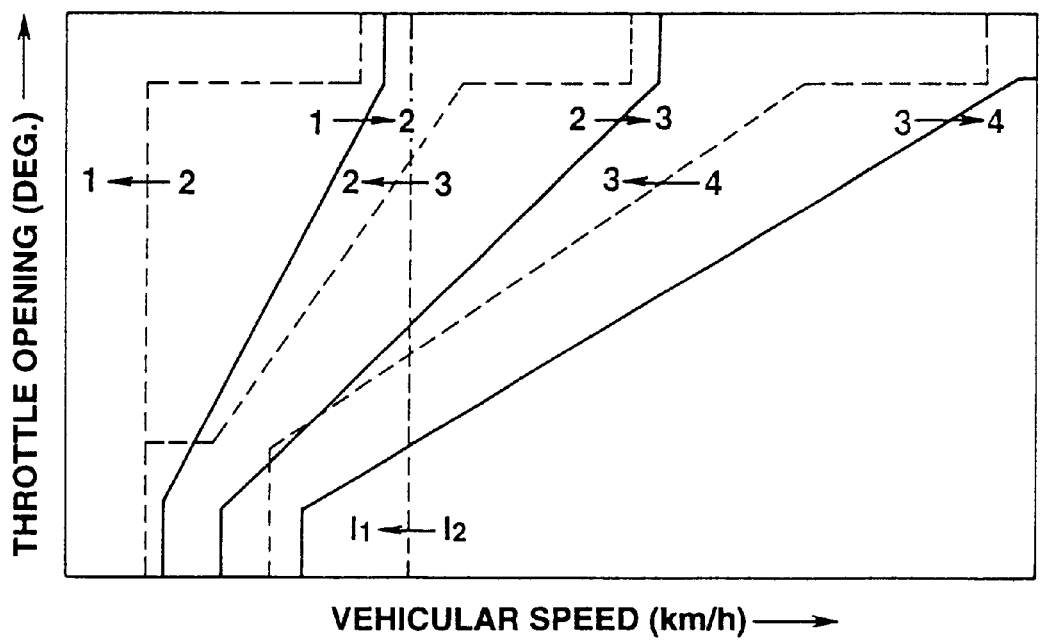
FIG. 10 is a view similar to FIG. 8, showing operation of shift solenoids.
FIG. 11 is a view similar to FIG. 6, showing a shift-point characteristic model.

Shift control for obtaining automatic shifting between first to fourth gears in the drive (D) range is carried out as follows. In accordance with a shift-point characteristic model chart as shown in FIG. 11 and the throttle-valve opening degree and vehicle speed sensed and when crossing a shift line of upshift or downshift, a shift command is given to determine a next gear. In order to obtain the gear determined, the A/T control unit 20 provides an on or off command to the shift solenoids (A) 21, (B) 22 in accordance with a shift-solenoid operation table as shown in FIG. 9.

It is noted that the low clutch L/C corresponds to a first engaging element, the 2-4 brake 2-4/B corresponds to a second engaging element, the high clutch H/C corresponds to a third engaging element, the low-clutch accumulator 9 corresponds to a first accumulator, the 2-4 brake accumulator unit 10 corresponds to a second accumulator, the high-clutch accumulator 11 corresponds to an accumulator for the third engaging element, the line-pressure duty solenoid 23 and low-clutch timing solenoid 25 correspond to a first device, and 2-4 brake duty solenoid 24 and 2-4 brake timing solenoid 26 correspond to a second device.

Next, the operation of the second embodiment will be described.

Figure 12:
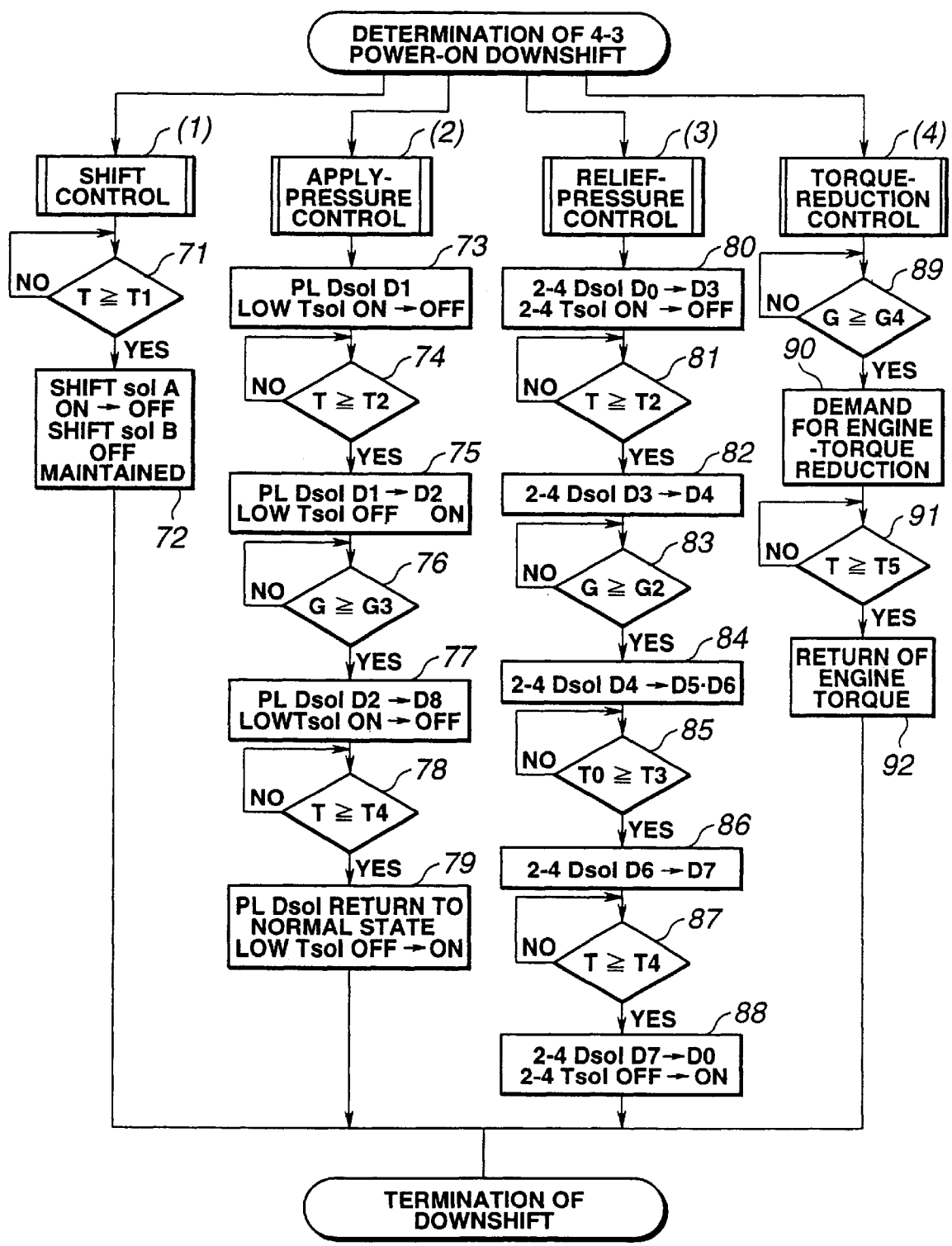
FIG. 12 is a flowchart showing 4-3 power-on downshift control carried out by an automatic-transmission control unit.
Figure 13:
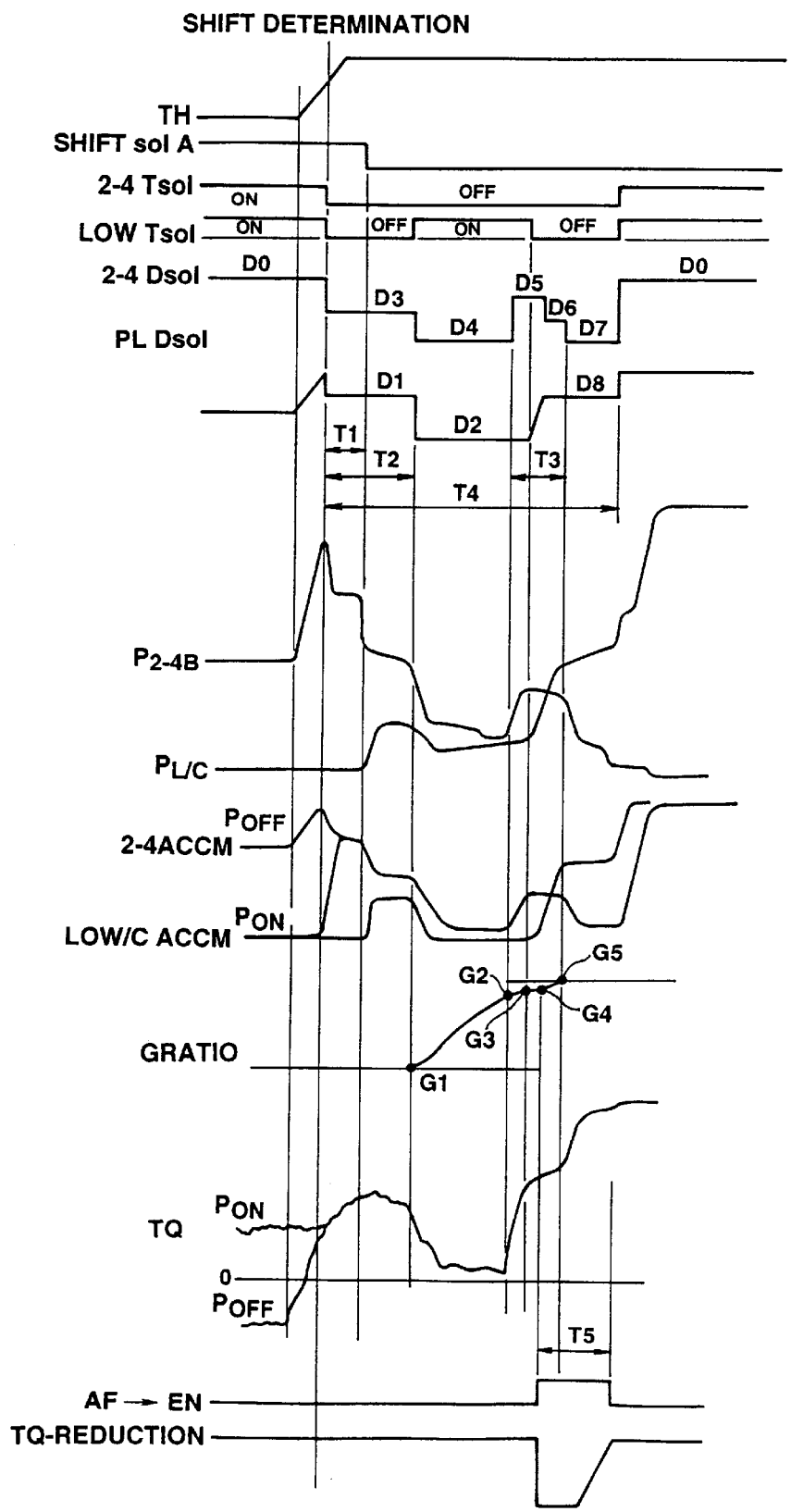
FIG. 13 is a time chart showing transient characteristics of a control command, hydraulic pressure, gear ratio, torque, etc. upon 4-3 power-on downshift.

Referring to FIGS. 12–13, electronic control upon 4-3 power-on downshift will be described. If it is determined that 4-3 power-on downshift is active, the following shift control (1), apply-pressure control (2), relief-pressure control (3), and torque-reduction control (4) are carried out separately. It is noted that processings are carried out at all times for increasing a timer value T indicative of an elapsed time after determination of 4-3 power-on downshift, and for calculating an actual gear ratio G or a ratio of an output rotating speed to an input rotating speed in an automatic transmission.

(1) Shift control is carried out by the shift solenoids (A) 21, (B) 22 as actuators to switch a hydraulic passage to drain an engagement pressure of the 2-4 brake 2-4/B, and supply a D-range pressure to the low clutch L/C. That is, referring to FIG. 12, in accordance with a processing at steps 71–72, a hydraulic passage is switched as soon as a time defined by a first timer value Ti elapsed after determination of 4-3 power-on downshift.

(2) Apply-pressure control is carried out by accumulator back-pressure control of the low clutch L/C on the engagement side, which applies the line-pressure duty solenoid 23 and the low-clutch timing solenoid 25 as actuators. That is, referring to FIGS. 12–13, in accordance with a processing at steps 73–79, the duty ratio of the line-pressure duty solenoid 23 is modified as indicated by a characteristic PLDsol, and on and off of the low-clutch timing solenoid 25 is controlled as indicated by a characteristic LWTsol.

(3) Relief-pressure control is carried out by accumulator back-pressure control of the 2-4 brake 2-4/B on the release side, which applies the 2-4 brake duty solenoid 24 and the 2-4 brake timing solenoid 26 as actuators. That is, referring to FIGS. 12–13, in accordance with a processing at steps 80–88, the duty ratio of the 2-4 brake duty solenoid 24 is modified as of the 2-4 brake timing solenoid 26 is controlled as indicated by a characteristic 2-4Tsol.

(4) Torque-reduction control is carried out by fuel cutoff, etc. in accordance with the torque-reduction requirement which the A/T control unit 20 outputs to the engine control unit 20. That is, referring to FIGS. 12–13, in accordance with steps 89–92, engine torque is reduced during a time defined by a fifth timer value T5 after achievement of a gear ratio G4 indicative of the final stage of shifting.

Hydraulic control upon 4-3 power-on downshift will be described. Apply-pressure control of the low clutch L/C and relief-pressure control of the 2-4 brake 2-4/B upon 4-3 power-on downshift are carried out separately by accumulator back-pressure control in the way as described above. This hydraulic control has the following features:

First, as indicated by the low-clutch timing solenoid characteristic LOWTsol and a low-clutch accumulator back-pressure characteristic LOW/CACCM in FIG. 13, a back pressure within the low-clutch accumulator 9 is increased in the initial stage of shifting, i.e. from shift determination to a second timer value T2, then decreased in the middle stage of shifting, i.e. from the second timer value T2 to a gear ratio G3, and increased again in the final stage of shifting, i.e. after the gear ratio G3.

Therefore, as indicated by a low-clutch pressure characteristic PL/C in FIG. 13, in the initial stage of shifting, the pressure is increased temporarily, so that in reducing a clearance between clutch plates, the low-clutch piston is moved to a position where a pressing force is effective. In the middle stage of shifting, the pressure is slightly decreased, which causes, however, no return of the piston due to frictional resistance, so that the low clutch L/C stands by in the state immediately before engagement. In the final stage of shifting, the pressure is increased due to increased precharge pressure and accumulator back pressure, so that the engagement capacity of the low clutch L/C is produced with higher response.

Second, as indicated by the 2-4 brake timing solenoid and accumulator back-pressure characteristics 2-4Tsol, 2-4ACCM in FIG. 13, control is carried out to maintain the engagement capacity of he 2-4 brake 2-4/B in the initial stage of shifting, i.e. from shift determination to the second timer value T2.

Therefore, as indicated by a gear-ratio characteristic GRATIO in FIG. 13, the gear ratio in the four gears of downshift is maintained until a time defined by the second timer value T2 elapses, preventing engine racing due to shift development when relieving the 2-4 brake pressure P2-4/B.

Third, as indicated by the 2-4 brake timing solenoid and accumulator back-pressure characteristics 2-4Tsol, 2-4ACCM in FIG. 13, control is carried out to temporarily increase, when the actual gear ratio G reaches G2, the engagement capacity of the 2-4 brake 2-4/B which is decreased until then.

Therefore, an increase in the 2-4 brake pressure P2-4/B on the release side prior to an increase in the low-clutch pressure PL/C on the engagement side delays shift development to reduce an up incline of the gear ratio, resulting in easy achievement of a timing for increasing the low-clutch pressure PL/C on the engagement side.

Fourth, the apply pressure of the low clutch L/C and the relief pressure of the 2-4 brake 2-4/B are controlled separately by the accumulator back pressure.

Specifically, if only the apply pressure is controlled without controlling the apply and relief pressures separately, the degree of freedom of torque-capacity control is low on the engagement and release sides in the transient stage of shifting since only the apply pressure can be controlled, and the relief pressure is influenced by apply-pressure control.

Moreover, if the apply and relief pressures are controlled directly, and not by the accumulator back pressure, the flow rate in the hydraulic chamber and passage have a great influence on hydraulic-pressure control, resulting in lack of the control stability.

On the other hand, if the apply and relief pressures are controlled separately by the accumulator back pressure, not only the degree of freedom of torque-capacity control becomes high, but the control responsibility and stability become excellent, enabling engagement- and release-pressure control which ensures excellent shift quality without using a one-way clutch which has been adopted to obtain an engaging timing with no shift shock upon 4-3 downshift.

Next, the effects of the second embodiment will be described.

First, in the automatic transmission which achieves shifting by engaging the low clutch L/C and releasing the 2-4 brake 2-4/B, the line-pressure duty solenoid 23 and low-clutch timing solenoid 25 and the 2-4 brake duty solenoid 24 and 2-4 brake timing solenoid 26 are arranged in the middle of the hydraulic passages of the low clutch L/C and the 2-4 brake 2-4/B to allow separate control of the low-clutch accumulator back pressure and the 2-4 brake accumulator back pressure, respectively. Thus, if the torque capacities on the engagement and release sides are controlled separately, stably and responsively upon 4-3 downshift, excellent shift capacity can be obtained without using a one-way clutch.

Second, the line-pressure duty solenoid 23 and the low-clutch timing solenoid 25 serve as devices for controlling the accumulator back pressures of the low clutch L/C and the high clutch H/C which do not pass from the release to the engagement state simultaneously and vice versa upon shifting between adjacent gears, resulting in achievement of separate control of the torque capacities on the engagement and release sides, and smaller number of the back-pressure control devices than that of the engaging elements.

Third, in the automatic transmission which achieves the four gears by the low clutch L/C, the 2-4 brake 2-4/B, and the high clutch H/C which are operated hydraulically, and the low one-way clutch LOW O.W.C which is operated mechanically upon 2-1 shift, the line-pressure duty solenoid 23 and the low-clutch timing solenoid 25 serve as devices for controlling both of the accumulator back pressure of the low clutch L/C engaged in the first to third gears and the accumulator back pressure of the high clutch H/C engaged in the third and fourth gears, and the 2-4 brake duty solenoid 24 and the 2-4 brake timing solenoid 26 serve as a device for controlling only the accumulator back pressure of the 2-4 brake 2-4/B engaged in the second and fourth gears. Thus, the fourth gear with separate control of the torque capacities on the engagement and release sides upon shifting can be achieved by one one-way clutch and two back-pressure control devices.

Fourth, the line-pressure duty solenoid 23 serves as a device for controlling both of the accumulator back pressure and the line pressure, reducing the number of duty solenoids, resulting in cost reduction.

Having described the present invention with regard to the preferred embodiments, it is noted that the present invention is not limited thereto, and various changes and modifications can be made without departing from the scope of the present invention.

What is claimed is:

1. A hydraulic control system for an automatic transmission which achieves shifting by releasing a first engaging element as engaged and engaging a second engaging element as released, the system comprising:
   a first passage connected to the first engaging element;
   a second passage connected to the second engaging element;
   a first accumulator arranged with said first passage, said first accumulator including a back-pressure chamber having a first pressure;
   a second accumulator arranged with said second passage, said second passage connecting said second accumulator to said second engaging element, said second accumulator including a back-pressure chamber having a second pressure, said second accumulator comprising two portions, each of the two portions including a cylinder, a piston, and a spring having a biasing direction opposite to said second pressure, respectively, said two portions providing a pressure having two different shelf values; and
   a timing valve connected to said back-pressure chamber of said first accumulator, said timing valve determining a timing for draining said first pressure of said first accumulator in accordance with said second pressure of said second accumulator and an engaging pressure of the second engaging element.

2. A hydraulic control system as claimed in claim 1, wherein said timing valve is switched to drain said first pressure of said first accumulator as soon as a differential pressure between said second pressure and said engagement pressure is equal to a predetermined value.

3. A hydraulic control system as claimed in claim 1, wherein said timing valve receives, at the same time, said second pressure of said second accumulator and the engagement pressure of the second engaging element, said second pressure and said engagement pressure being opposite to each other.

4. A hydraulic control system as claimed in claim 1, wherein said draining timing is set at a transient portion between said two different shelf values of said pressure.

5. A hydraulic control system as claimed in claim 1, wherein each of the two portions of said second accumulator are connected to the same second passage.

6. A hydraulic control system for an automatic transmission which achieves shifting by releasing a first engaging element as engaged and engaging a second engaging element as released, the system comprising:
   a first passage connected to the first engaging element;
   a second passage connected to the second engaging element;
   a first accumulator arranged with said first passage, said first accumulator including a back pressure chamber having a first pressure;
   a second accumulator arranged with said second passage, said second passage connecting said second accumulator to said second engaging element, said second accumulator including a back-pressure chamber having a second pressure, said second accumulator comprising two portions, each of the two portions including a cylinder, a piston, and a spring having a biasing direction opposite to said second pressure, respectively, said two portions providing a pressure having two different shelf values;
   a timing valve connected to said back-pressure chamber of said first accumulator, said timing valve determining a timing for draining said first pressure of said first accumulator in accordance with said second pressure of said second accumulator;
   a first device connected to said back-pressure chamber of said first accumulator, said first device controlling said first pressure of said first accumulator; and
   a second device connected to said back-pressure chamber of said second accumulator, said second device controlling said second pressure of said second accumulator.

7. A hydraulic control system for an automatic transmission which achieves shifting by releasing a first engaging element as engaged and engaging a second engaging element as released, the system comprising:
   a first passage connected to the first engaging element;
   a second passage connected to the second engaging element;
   a first accumulator arranged with said first passage, said first accumulator including a back-pressure chamber having a first pressure;
   a second accumulator arranged with said second passage, said second passage connecting said second accumulator to said second engaging element, said second accumulator including a back-pressure chamber having a second pressure, said second accumulator comprising two portions, each of the two portions including a cylinder, a piston, and a spring having a biasing direction opposite to said second pressure, respectively, said two portions providing a pressure having two different shelf values;
   a timing valve connected to said back-pressure chamber of said first accumulator, said timing valve determining a timing for draining said first pressure of said first accumulator in accordance with said second pressure of said second accumulator and an engaging pressure of the second engaging element, said timing valve receiving, at the same time, said second pressure of said second accumulator and the engagement pressure of the second engaging element, said second pressure and said engagement pressure being opposite to each other, said timing valve being switched to drain said first pressure of said first accumulator as soon as a differential pressure between said second pressure and said engagement pressure being equal to a predetermined value;

a first device connected to said back-pressure chamber of said first accumulator, said first device controlling said first pressure of said first accumulator; and a second device connected to said back-pressure chamber of said second accumulator, said second device controlling said second pressure of said second accumulator.

8. A hydraulic control system for an automatic transmission which achieves shifting by engaging and releasing first, second, and third engaging elements, the system comprising:

a first passage connected to the first engaging element;

a second passage connected to the second engaging element;

a third passage connected to the third engaging element;

a first accumulator arranged with said first passage, said first accumulator including a back-pressure chamber providing a first pressure;

a second accumulator arranged with said second passage, said second passage connecting said second accumulator to said second engaging element, said second accumulator including a back-pressure chamber providing a second pressure, said second accumulator comprising two portions, each of the two portions including a cylinder, a piston, and a spring having a biasing direction opposite to said second pressure, respectively, said two portions providing a pressure having two different shelf values;

a third accumulator arranged with said third passage, said third accumulator including a back-pressure chamber providing a third pressure, said third accumulator comprising two portions, each of the two portions including a cylinder, a piston, and a spring having a biasing direction opposite to said third pressure, respectively, said two portions providing a pressure having two different shelf values;

a first device connected to said back-pressure chamber of said first accumulator, said first device controlling said first pressure of said first accumulator; and a second device connected to said back-pressure chamber of said second accumulator, said second device controlling said second pressure of said second accumulator.

9. A hydraulic control system as claimed in claim 8, wherein one of said first and second devices controls two of said first, second and third pressures of said first, second and third accumulators which fail to pass from the release to the engagement state simultaneously and vice versa.

10. A hydraulic control system as claimed in claim 9, wherein said first device also controls a line pressure.

11. A hydraulic control system for an automatic transmission which achieves four speeds by first, second, and third engaging elements operated hydraulically and a one-way clutch operated mechanically upon 2-1 shift, said first engaging element being engaged in the first, second, and third gears, said second engaging element being engaged in the second and fourth gears, said third engaging element being engaged in the third and fourth gears, the system comprising:

a first passage connected to the first engaging element;

a second passage connected to the second engaging element;

a third passage connected to the third engaging element;

a first accumulator arranged with said first passage, said first accumulator including a back-pressure chamber providing a first pressure;

a second accumulator arranged with said second passage, said second passage connecting said second accumulator to said second engaging element, said second accumulator including a back-pressure chamber providing a second pressure, said second accumulator comprising two portions, each of the two portions including a cylinder, a piston, and a spring having a biasing direction opposite to said second pressure, respectively, said two portions providing a pressure having two different shelf values;

a third accumulator arranged with said third passage, said third accumulator including a back-pressure chamber providing a third pressure, said third accumulator comprising two portions, each of the two portions including a cylinder, a piston, and a spring having a biasing direction opposite to said third pressure, respectively, said two portions providing a pressure having two different shelf values;

a first device connected to said back-pressure chambers of said first and third accumulators, said first device controlling said first and third pressures of said first and third accumulators; and a second device connected to said back-pressure chamber of said second accumulator, said second device controlling said second pressure of said second accumulator.

12. A hydraulic control system for an automatic transmission which achieves shifting by releasing a first engaging element as engaged and engaging a second engaging element as released, the system comprising:

a first passage connected to the first engaging element;

a second passage connected to the second engaging element;

a first accumulator arranged with said first passage, said first accumulator including a back-pressure chamber having a first pressure;

a second accumulator arranged with said second passage, said second passage connecting said second accumulator to said second engaging element, said second accumulator including a back-pressure chamber having a second pressure, said second accumulator comprising two portions, each of the two portions including a cylinder, a piston, and a spring having a biasing direction opposite to said second pressure, respectively, said two portions providing a pressure having two different shelf values; and a timing valve connected to said back-pressure chamber of said first accumulator, said timing valve determining a timing for draining said first pressure of said first accumulator in accordance with said second pressure of said second accumulator and an engaging pressure of the second engaging element, said timing valve receiving, at the same time, said second pressure of said second accumulator and the engagement pressure of the second engaging element, said second pressure and said engagement pressure being opposite to each other.

13. A hydraulic control system as claimed in claim 12, wherein said draining timing is set at a transient portion between said two different shelf values of said pressure.

14. A hydraulic control system as claimed in claim 12, wherein each of the two portions of said second accumulator are connected to the same second passage.

* * * * *